(12) United States Patent
Bhardwaj et al.

(10) Patent No.: US 8,513,919 B2
(45) Date of Patent: Aug. 20, 2013

(54) SWELLING MANAGEMENT IN BATTERIES FOR PORTABLE ELECTRONIC DEVICES

(75) Inventors: Ramesh C. Bhardwaj, Fremont, CA (US); Taisum Hwang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 395 days.

(21) Appl. No.: 12/845,018

(22) Filed: Jul. 28, 2010

(65) Prior Publication Data

US 2012/0025771 A1  Feb. 2, 2012

(51) Int. Cl.
*H02J 7/00* (2006.01)

(52) U.S. Cl.
USPC ............................. 320/134; 320/130; 320/152

(58) Field of Classification Search
USPC ................. 320/112, 114, 128, 130, 134, 136, 320/152
See application file for complete search history.

(56) References Cited

U.S. PATENT DOCUMENTS

| 6,060,185 A * | 5/2000 | Okutoh ............................. 429/7 |
| 2006/0226812 A1* | 10/2006 | Patino et al. .................. 320/128 |
| 2007/0139008 A1* | 6/2007 | Sterz et al. .................... 320/125 |

* cited by examiner

*Primary Examiner* — Edward Tso
*Assistant Examiner* — Aaron Piggush
(74) *Attorney, Agent, or Firm* — Park, Vaughan, Fleming & Dowler, LLP; Chia-Hsin Suen

(57) ABSTRACT

The disclosed embodiments provide a system that manages use of a battery in a portable electronic device. During operation, the system monitors a cycle number of the battery during use of the battery with the portable electronic device, wherein the cycle number corresponds to a number of charge-discharge cycles of the battery. If the cycle number exceeds a first cycle number threshold, the system modifies a charging technique for the battery to manage swelling in the battery.

21 Claims, 7 Drawing Sheets

SWELLING MANAGEMENT IN BATTERIES FOR PORTABLE ELECTRONIC DEVICES

BACKGROUND

1. Field

The present embodiments relate to batteries for portable electronic devices. More specifically, the present embodiments relate to techniques for managing swelling in batteries for portable electronic devices.

2. Related Art

Portable electronic devices, such as laptop computers, portable media players, and/or mobile phones, typically operate using a rechargeable battery. Furthermore, designs for such batteries often include battery packs that contain battery cells connected together in various series and parallel configurations. For example, a six-cell battery pack of lithium cells may be configured in a three in series, two in parallel (3s2p) configuration. Hence, if a single cell can provide a maximum of 3 amps with a voltage ranging from 2.7 volts to 4.2 volts, then the entire battery pack can have a voltage range of 8.1 volts to 12.6 volts and provide 6 amps of current. The charge in such batteries is typically managed by a circuit, which is commonly known as a protection circuit module (PCM) and/or battery management unit (BMU).

During operation, the battery's capacity may diminish over time from use, age, lack of maintenance, damage, heat, and/or manufacturing defects. For example, oxidation of electrolyte and/or degradation of cathode and anode material within a battery may be caused by repeated charge cycles and/or age, which in turn may cause a gradual reduction in the battery's capacity. As the battery continues to age and degrade, the capacity's rate of reduction may increase. Moreover, once the battery reaches 80% of initial capacity, the battery's useful life may be finished.

Subsequent use of a battery beyond the battery's end-of-life may cause swelling of the battery's cells and may potentially damage the device that is powered by the battery, while providing little power to the device. Moreover, conventional battery-monitoring mechanisms may not include functionality to manage swelling of the battery. As a result, a user of the device may not be aware of the battery's swelling and/or degradation until the swelling results in damage to the device, which can possibly involve a fire and/or an explosion.

Hence, what is needed is a mechanism for managing and mitigating swelling in batteries for portable electronic devices.

SUMMARY

The disclosed embodiments provide a system that manages use of a battery in a portable electronic device. During operation, the system monitors a cycle number of the battery during use of the battery with the portable electronic device, wherein the cycle number corresponds to a number of charge-discharge cycles of the battery. If the cycle number exceeds a first cycle number threshold, the system modifies a charging technique for the battery to manage swelling in the battery.

In some embodiments, the system also monitors a temperature of the battery during use of the battery with the portable electronic device. If the temperature exceeds a temperature threshold, the system further modifies the charging technique for the battery.

In some embodiments, the system also disables use of the battery if the cycle number reaches a shutdown threshold for the battery.

In some embodiments, modifying the charging technique to manage swelling in the battery involves reducing a charge voltage of the battery if the cycle number exceeds the first cycle threshold. The charge voltage may further be reduced if the cycle number exceeds a second cycle number threshold that is higher than the first cycle number threshold.

In some embodiments, modifying the charging technique to manage swelling in the battery involves reducing a constant charge current of the battery if the cycle number exceeds the first cycle threshold. The constant charge current may further be reduced if the cycle number exceeds a second cycle number threshold that is higher than the first cycle number threshold.

In some embodiments, the battery corresponds to a lithium-polymer battery.

BRIEF DESCRIPTION OF THE FIGURES

In the figures, like reference numerals refer to the same figure elements.

DETAILED DESCRIPTION

Figure 1:
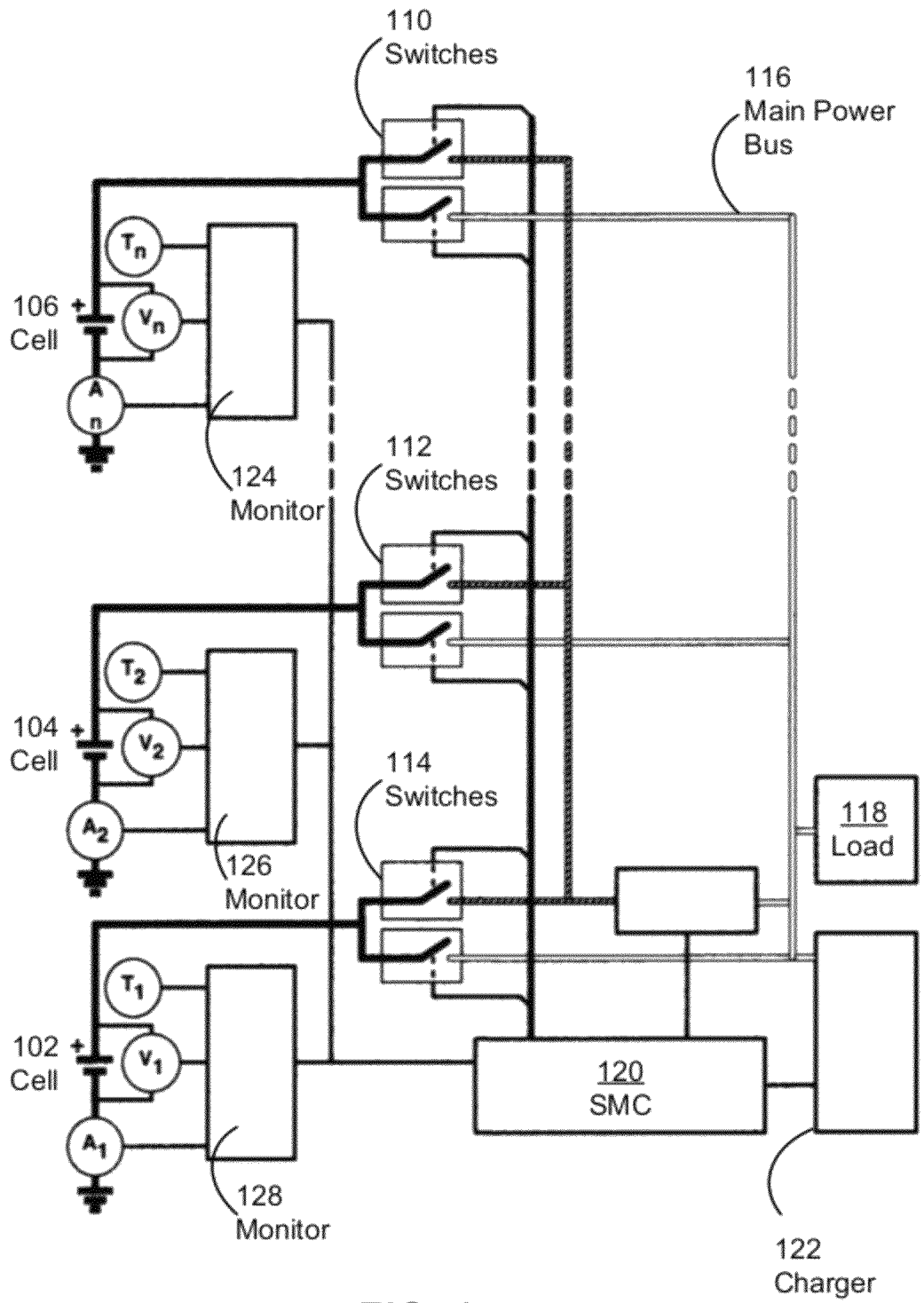
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for monitoring a battery in a portable electronic device. The battery may include one or more cells in a parallel and/or series configuration and supply power to a mobile phone, laptop computer, portable media player, and/or peripheral device. For example, the battery may correspond to a lithium-polymer battery that includes one or more cells, each of which includes a jelly roll of layers wound together (e.g., a cathode with an active coating, a separator, and an anode with an active coating), and a flexible pouch enclosing the jelly roll. In addition, the battery may be reused up to a number of charge cycles before losing enough capacity to reach an end-of-life. The battery may also swell as capacity diminishes over time.

More specifically, embodiments provide a method and system for managing swelling in the battery. During use of the battery with the portable electronic device, the temperature of the battery and/or a cycle number corresponding to a number of charge-discharge cycles of the battery may be monitored. If the temperature exceeds a temperature threshold and/or the cycle number exceeds a first cycle number threshold, a charging technique for the battery may be modified to manage swelling in the battery. Modifying the charging technique may correspond to reducing the charge voltage and/or constant charge current of the battery. The charge voltage and/or constant charge current may further be reduced if the cycle number exceeds a second cycle number threshold that is higher than the first cycle number threshold. Such reduction in charge voltage and/or constant charge current may reduce both swelling and capacity in the battery, thus mitigating both use of the battery after the battery's end-of-life and damage to the portable electronic device from swelling of the battery.

FIG. 1 shows a schematic of a system in accordance with an embodiment. The system may provide a power source to a portable electronic device, such as a mobile phone, personal digital assistant (PDA), laptop computer, tablet computer, portable media player, and/or peripheral device. In other words, the system may correspond to a battery that supplies power to a load 118 from one or more components (e.g., processors, peripheral devices, backlights, etc.) within the portable electronic device. For example, the battery may correspond to a lithium-polymer battery that includes one or more cells, each of which includes a jelly roll of layers wound together (e.g., a cathode with an active coating, a separator, and an anode with an active coating), and a flexible pouch enclosing the jelly roll. As shown in FIG. 1, the system includes a number of cells 102-106, a set of switches 110-114, a main power bus 116, a system microcontroller (SMC) 120, a charger 122, and a set of monitors 124-128.

In one or more embodiments, cells 102-106 are connected in a series and/or parallel configuration with one another using main power bus 116. Each cell 102-106 may include a sense resistor (not shown) that measures the cell's current. Furthermore, the voltage and temperature of each cell 102-106 may be measured with a thermistor (not shown), which may further allow a battery "gas gauge" mechanism to determine the cell's state of charge, impedance, capacity, charging voltage, and/or remaining charge. Measurements of voltage, current, temperature, and/or other parameters associated with each cell 102-106 may be collected by a corresponding monitor 124-128. Alternatively, one monitoring apparatus may be used to collect sensor data from multiple cells 102-106 in the battery.

Data collected by monitors 124-128 may then be used by SMC 120 to assess the state of charge, capacity, and/or health of cells 102-106. Monitors 124-128 and SMC 120 may be implemented by one or more components (e.g., processors, circuits, etc.) of the portable electronic device.

In particular, SMC 120 may use the data to manage use of the battery in the portable electronic device. For example, SMC 120 may correspond to a management apparatus that uses the state of charge of each cell 102-106 to adjust the charging and/or discharging of the cell by connecting or disconnecting the cell to main power bus 116 and charger 122 using a set of switches 110-114. Fully discharged cells may be disconnected from main power bus 116 during discharging of the battery to enable cells with additional charge to continue to supply power to load 118. Along the same lines, fully charged cells may be disconnected from main power bus 116 during charging of the battery to allow other cells to continue charging.

Those skilled in the art will appreciate that reductions in battery capacity may result from factors such as age, use, defects, heat, and/or damage. Furthermore, a decrease in battery capacity beyond a certain threshold (e.g., below 80% of initial capacity) may be accompanied by swelling of the battery that damages or distorts the portable electronic device and/or leads to a fire or explosion.

In particular, charging and discharging of the battery may cause a reaction of electrolyte with cathode and anode material. In turn, the reaction may both decrease the capacity of the battery and cause swelling through enlargement of the electrode and/or gas buildup inside the battery. Moreover, the reaction may be accelerated if the battery is operated at higher temperatures. For example, a lithium-polymer battery with 1050 charge-discharge cycles may reach 80% of initial capacity and increase in thickness by 8% if operated at 25° Celsius. However, operation of the same battery at 45° Celsius may decrease the capacity to 70% of initial capacity and increase the swelling to 10% after 1050 charge-discharge cycles.

At the same time, a user of the portable electronic device may not be aware of the loss of capacity and/or swelling and may continue using the battery with the portable electronic device beyond the battery's end-of-life. For example, a mobile phone battery with an initial runtime of 10 hours may begin swelling beyond an 8% swell budget in the mobile phone after the runtime drops below 8 hours. However, a user of the mobile phone may not notice the decrease in runtime and may continue using the mobile phone without replacing the battery, thus subjecting the mobile phone to damage from the swelling.

In one or more embodiments, the system of FIG. 1 includes functionality to manage swelling in cells 102-106. During use of the battery with the portable electronic device, monitors 124-128 and/or SMC 120 may monitor a cycle number (e.g., the number of charge-discharge cycles of the battery) and/or a temperature of the battery. For example, SMC 120 may monitor the cycle number by tracking the charging and/or discharging of cells 102-106 and obtain temperature measurements of cells 102-106 from monitors 124-128. In addition, SMC 120 may modify a charging technique for the battery to manage swelling in the battery if the cycle number exceeds one or more cycle number thresholds and/or the temperature exceeds one or more temperature thresholds.

More specifically, SMC 120 may modify the charging technique by reducing a charge voltage and/or a constant charge current of the battery each time the battery exceeds a cycle number and/or temperature threshold. For example, SMC 120 may reduce the charge voltage and/or constant charge current of the battery every few hundred charge-discharge cycles after the battery's cycle number exceeds 1050. SMC 120 may also combine reductions in charge voltage and constant charge current by charging the battery at a reduced constant charge current until a reduced charge voltage is reached, then discontinuing charging of the battery. SMC 120 may additionally disable use of the battery after the cycle number reaches a shutdown threshold. Battery swelling and capacity as a function of cycle number, charge voltage, and/or temperature are discussed in further detail below with respect to FIGS. 2-4.

For example, if the temperature of the battery is below 45° Celsius, SMC 120 may reduce the charge voltage from 4.2 volts to 4.05 volts after the battery exceeds 1050 charge-discharge cycles, and then from 4.05 volts to 3.95 volts after the battery exceeds 1500 charge-discharge cycles. Finally, SMC 120 may disable use of the battery once the battery reaches 2000 charge-discharge cycles. On the other hand, if the temperature of the battery exceeds 45° Celsius, SMC 120 may charge the battery at 4.1 volts until the battery reaches 1050 charge-discharge cycles. SMC 120 may subsequently lower the charge voltage to 4.05 volts after the battery exceeds 1300 charge-discharge cycles and to 3.95 volts after the battery exceeds 1500 charge-discharge cycles. SMC 120 may then disable use of the battery once the battery reaches 1500 charge-discharge cycles. Modification of charging techniques to manage swelling in batteries is discussed in further detail below with respect to FIG. 5.

Such modifications to the charging technique may mitigate swelling-induced damage to the portable electronic device by both reducing swelling in the battery and encouraging replacement of the battery. More specifically, a reduced charge voltage and/or constant charge current may cause the battery to charge at a slower rate and/or stop charging before a fully charged state is reached, which in turn may reduce gas buildup that causes the battery to swell. The incomplete charge may also reduce the runtime of the battery to a point that prompts the user to replace the battery after the battery's end-of-life. Furthermore, damage to the portable electronic device may be prevented by disabling the battery after the shutdown threshold is reached.

Figure 2:
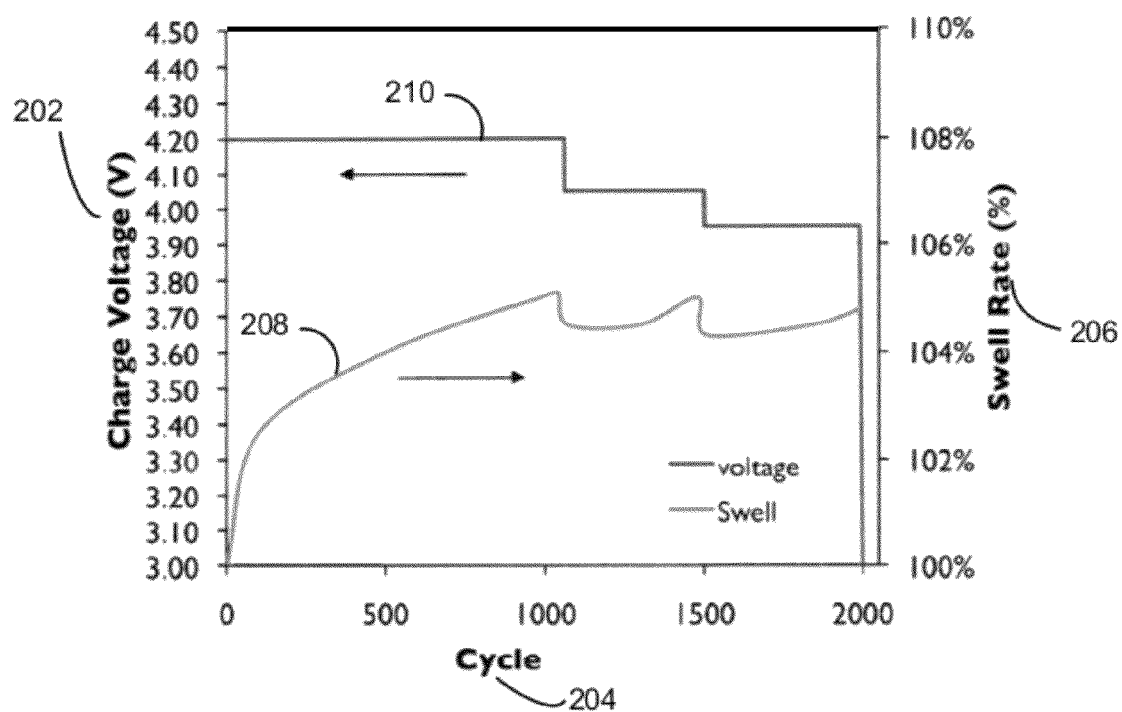
FIG. 2 shows an exemplary plot of charge voltage and swell rate as a function of cycle number in accordance with an embodiment.

FIG. 2 shows an exemplary plot of charge voltage 210 and swell rate 208 for a battery as a function of the battery's cycle number 204 in accordance with an embodiment. As shown in FIG. 2, charge voltage 210 is shown in volts 202 as a function of cycle number 204, while swell rate 208 is shown in terms of a percentage 206 of the initial size and/or thickness of the battery as a function of cycle number 204.

More specifically, FIG. 2 shows the effect of reducing charge voltage 210 on swell rate 208. Charge voltage 210 may be 4.2 volts for the first 1050 charge-discharge cycles of the battery to allow the battery to charge fully. At the same time, gas buildup and/or electrode enlargement resulting from use of the battery may cause swell rate 208 to reach 105% of the battery's initial size over the first 1050 charge-discharge cycles. After 1050 charge-discharge cycles, a reduction of charge voltage 210 to 4.05 volts is accompanied by a corresponding decrease in swell rate 208 of about 0.5%.

However, charging of the battery at 4.05 volts after 1050 charge-discharge cycles may cause swell rate 208 to return to the 105% mark at around 1500 charge-discharge cycles. The additional swelling may be managed by further reducing charge voltage 210 to 3.95 volts, allowing swell rate 208 to decrease again by about 0.5%. Finally, charge voltage 210 may be reduced to 3 volts (e.g., the fully discharged voltage of the battery) to disable use of the battery after a shutdown threshold of 2000 charge-discharge cycles.

Figure 3:
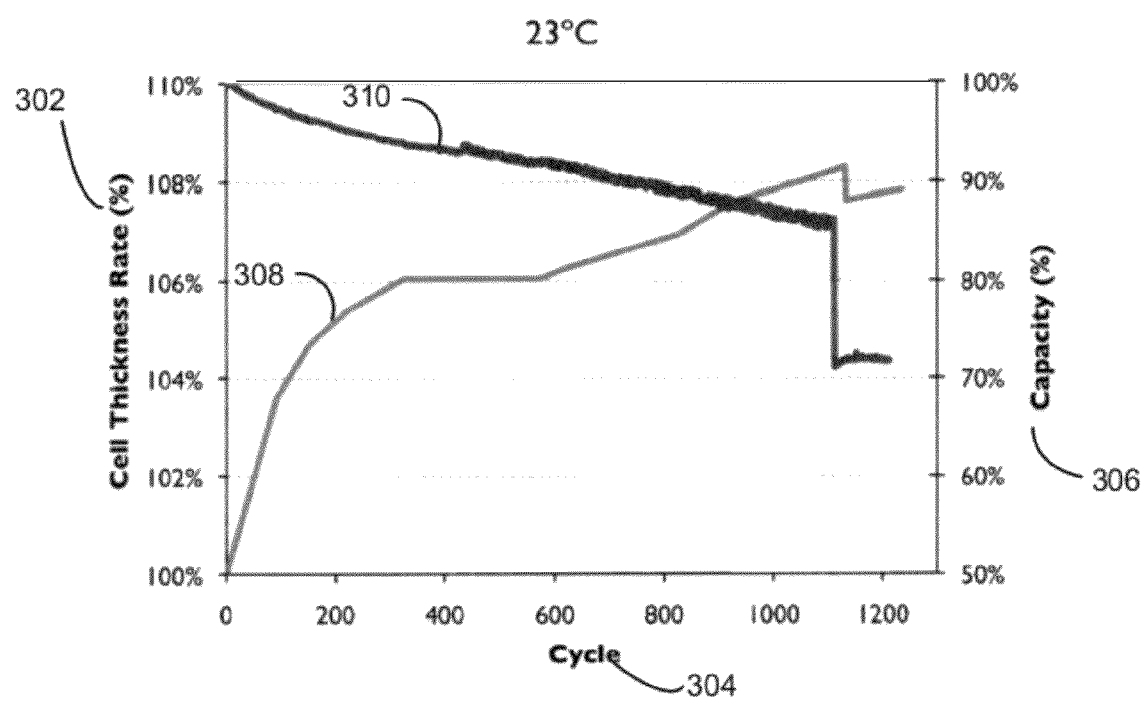
FIG. 3 shows an exemplary plot of cell thickness and capacity as a function of cycle number in accordance with an embodiment.

FIG. 3 shows an exemplary plot of cell thickness 308 and capacity 310 of a battery as a function of cycle number 304 in accordance with an embodiment. Cell thickness 308 may be displayed as a percentage 302 of the initial thickness of the battery over a number of charge-discharge cycles 304, and capacity 310 may be displayed as a percentage 306 of the battery's initial capacity over the same number of charge-discharge cycles. In addition, values of cell thickness 308 and capacity 310 in FIG. 3 may correspond to use of the battery at 23° Celsius.

As capacity 310 decreases during use of the battery, cell thickness 308 may increase. In other words, cell thickness 308 may be inversely proportional to capacity 310. Furthermore, a drop in both cell thickness 308 and capacity 310 at around 1050 cycles may be caused by a lowering of the charge voltage and/or constant charge current of the battery. For example, cell thickness 308 and capacity 310 may decrease after the charge voltage is reduced from 4.2 volts to 4.05 volts and/or the constant charge current is reduced from 500 mAh to 300 mAh. As shown in FIG. 3, the decrease in cell thickness 308 may allow the battery to remain within an 8% swell budget for a portable electronic device with which the battery is used.

The reductions in charge voltage and/or constant charge current may additionally facilitate replacement of the battery by reducing capacity 310 to an extent that is noticeable by a user of the battery. For example, an age-related reduction of capacity 310 to 85% of initial capacity by the $1050^{th}$ charge-discharge cycle may be further reduced by lowering the charge voltage so that capacity 310 after the $1050^{th}$ charge-discharge cycle is 85% of 85%, or around 72% of initial capacity. Additional reductions in charge voltage after the $1500^{th}$ charge-discharge cycle may further reduce capacity 310 to a point that causes the user to discontinue use of the battery. Reductions in charge voltage and/or constant charge current may thus mitigate damage from swelling of the battery by both reducing the swelling and encouraging replacement of the battery before the swelling becomes problematic.

Figure 4:
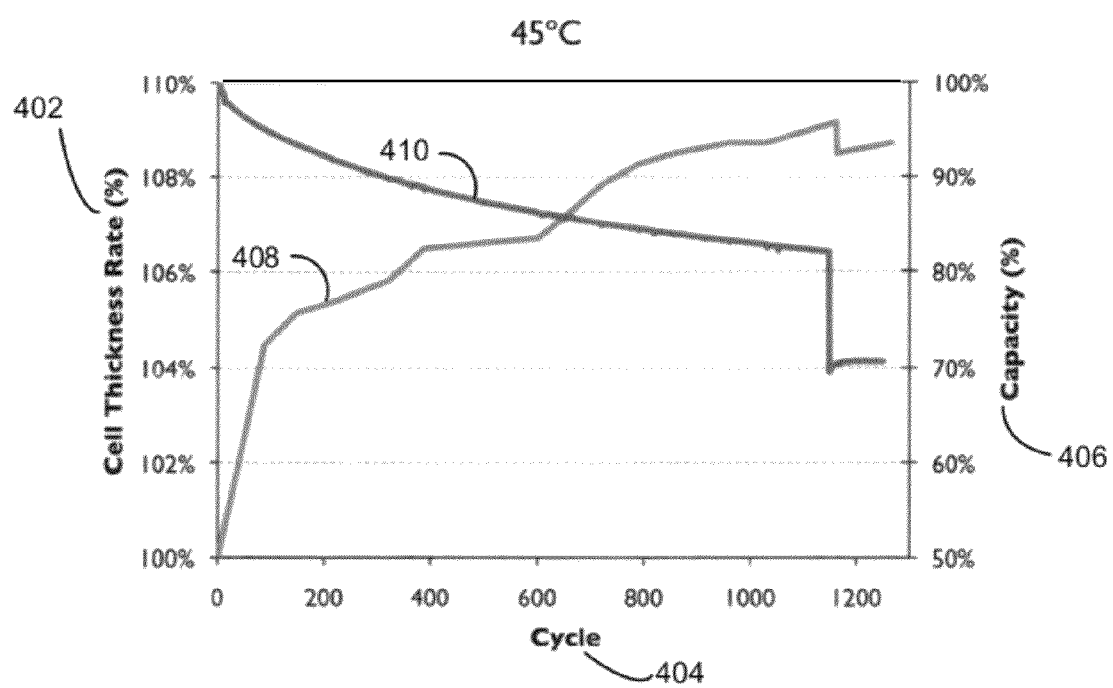
FIG. 4 shows an exemplary plot of cell thickness and capacity as a function of cycle number in accordance with an embodiment.

FIG. 4 shows an exemplary plot of cell thickness 408 and capacity 410 of a battery as a function of cycle number 404 in accordance with an embodiment. As with the plot of FIG. 3, cell thickness 408 may be displayed as a percentage 402 of the initial thickness of the battery over a number of charge-discharge cycles 404, and capacity 410 may be displayed as a percentage 406 of the battery's initial capacity over the same number of charge-discharge cycles.

However, the plot of FIG. 4 may show values for cell thickness 408 and capacity 410 that correspond to use of the battery at 45° Celsius instead of 23° Celsius. In particular, the elevated temperature of the battery may accelerate the decrease in capacity 410 as well as the corresponding increase in cell thickness 408 over time. As a result, cell thickness 408 may exceed an 8% swell budget around the $800^{th}$ charge-discharge cycle instead of the $1050^{th}$ charge-discharge cycle. Moreover, lowering of the charge voltage after the $1050^{th}$ charge-discharge cycle may not be sufficient to reduce cell thickness 408 to below the 8% swell budget. Consequently, operation of the battery at 45° Celsius may require further modifications to the charging technique to effectively manage swelling in the battery, as discussed below with respect to FIG. 5.

Figure 5:
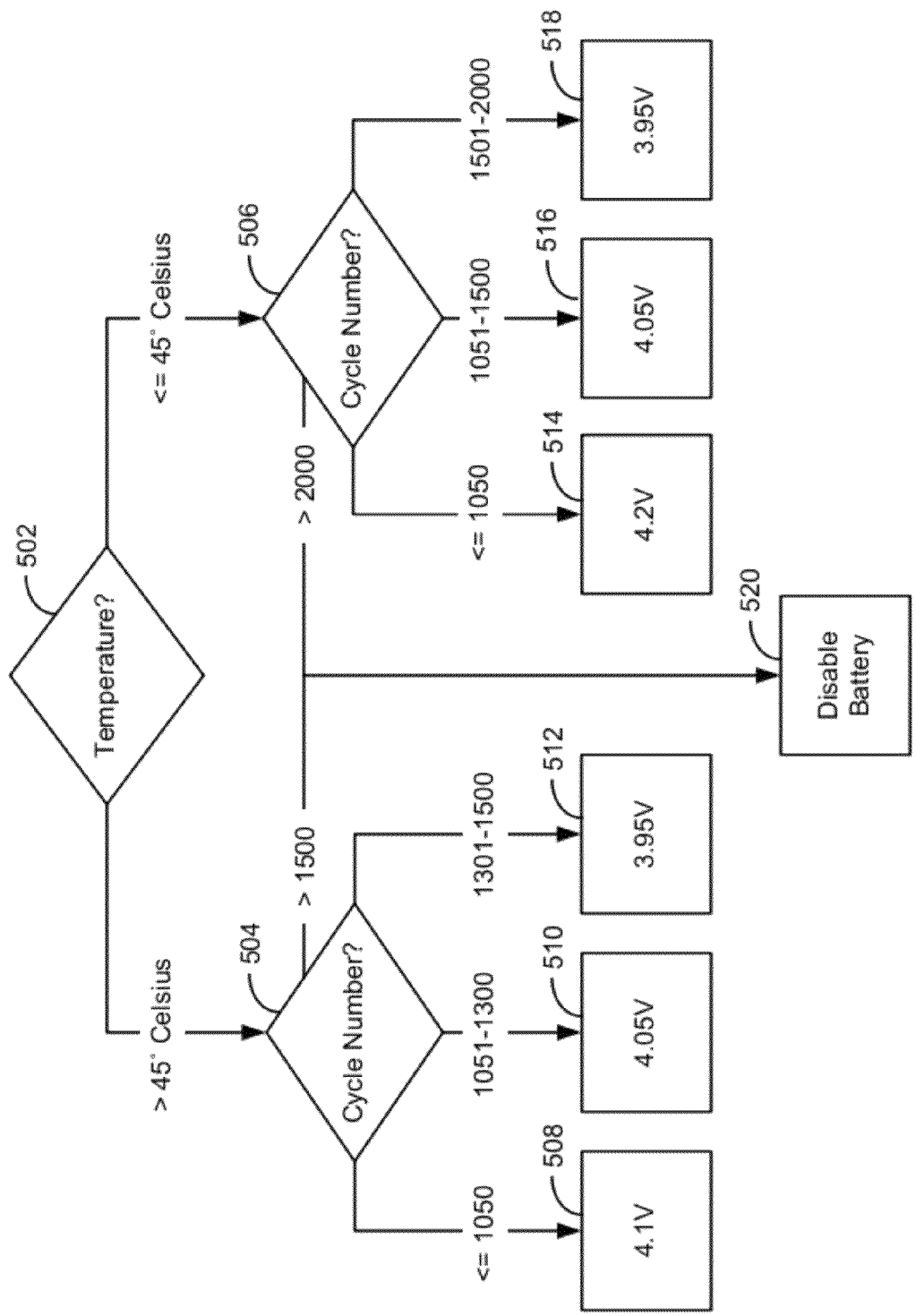
FIG. 5 shows an exemplary charging technique for managing swelling in a battery in accordance with an embodiment.

FIG. 5 shows an exemplary charging technique for managing swelling in a battery in accordance with an embodiment. More specifically, FIG. 5 shows a charging technique that modifies a charge voltage of the battery based on a temperature 502 and/or a cycle number 504-506 of the battery. Temperature 502 and cycle number 504-506 may be monitored during use of the battery with a portable electronic device. For example, temperature readings may be collected by one or more thermistors in the battery, and the battery's cycle number may be monitored by tracking the number of charge-discharge cycles in the battery.

As discussed above, a higher temperature may accelerate swelling in the battery. In particular, a temperature threshold of 45° Celsius may trigger a number of reductions in the charge voltage of the battery. If temperature 502 is above the temperature threshold, the battery's charge voltage is based on three cycle number thresholds of 1050, 1300, and 1500. If the battery's cycle number 504 is at or below the first cycle number threshold of 1050, the battery is charged at a charge voltage 508 of 4.1 volts. If cycle number 504 is above the first cycle number threshold and at or below a second cycle number threshold of 1300, the battery is charged at a charge voltage 510 of 4.05 volts. If cycle number 504 is above the second cycle number threshold and at or below a third cycle number threshold of 1500, the battery is charged at a charge voltage 512 of 3.95 volts. Finally, the battery is disabled 520 if cycle number 504 exceeds the third cycle number threshold. In other words, the third cycle number threshold of 1500 may correspond to a shutdown threshold for the battery at a temperature of above 45° Celsius.

If temperature 502 is at or below the temperature threshold of 45° Celsius, the battery's charge voltage is based on three cycle number thresholds of 1050, 1500, and 2000. If the battery's cycle number 506 is at or below the first cycle number threshold of 1050, the battery is charged at a charge voltage 514 of 4.2 volts. If cycle number 506 is above the first cycle number threshold and at or below a second cycle number threshold of 1500, the battery is charged at a charge voltage 516 of 4.05 volts. If cycle number 506 is above the second cycle number threshold and at or below a third cycle number threshold of 2000, the battery is charged at a charge voltage 518 of 3.95 volts. Finally, the battery is disabled 520 if cycle number 506 exceeds the third cycle number threshold (e.g., shutdown threshold) of 2000. As a result, the battery may be charged at higher charge voltages for longer periods of time if the battery is operated at or below 45° Celsius than if the battery were operated at above 45° Celsius.

Figure 6:
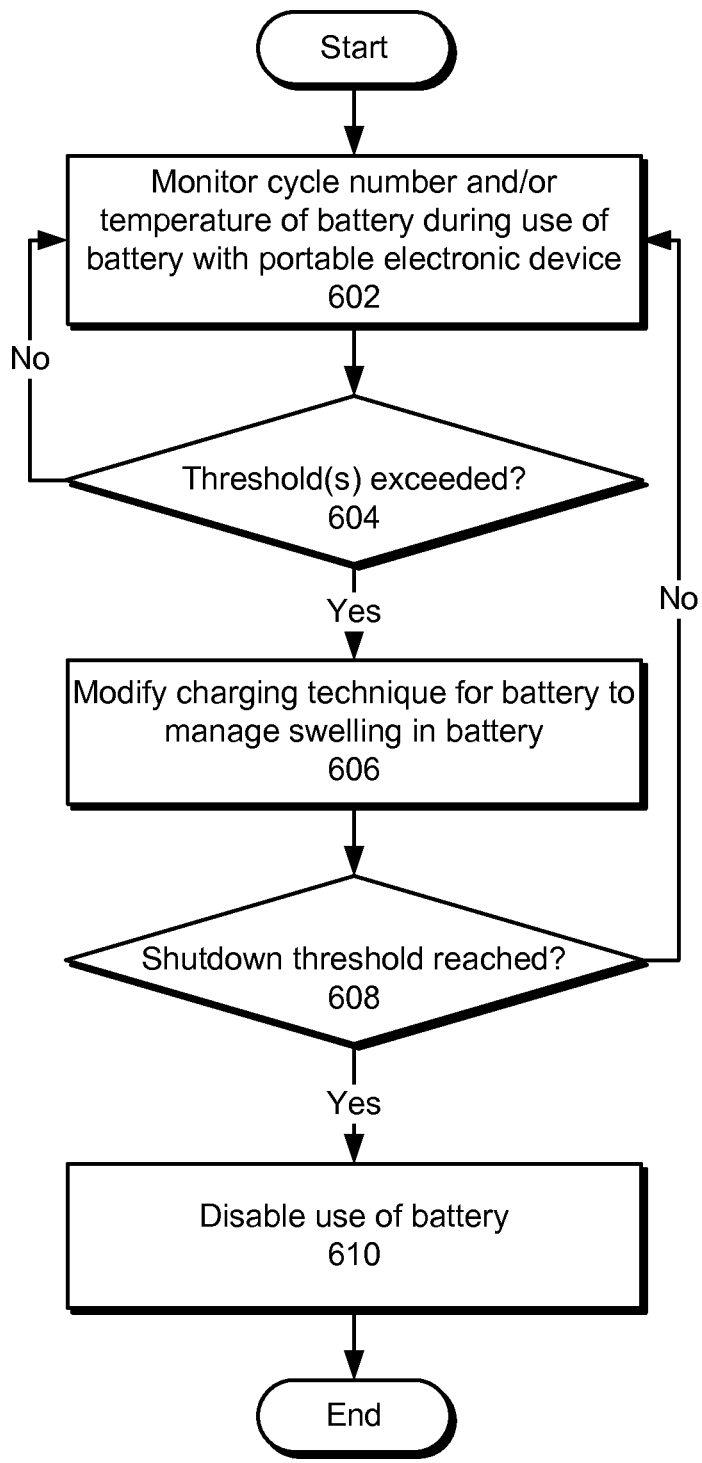
FIG. 6 shows a flowchart illustrating the process of managing use of a battery in a portable electronic device in accordance with an embodiment.

FIG. 6 shows a flowchart illustrating the process of managing use of a battery in a portable electronic device in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, a cycle number and/or temperature of the battery are monitored during use of the battery with the portable electronic device (operation 602). The cycle number may correspond to a number of charge-discharge cycles of the battery. The cycle number and/or temperature may also exceed one or more thresholds (operation 604). For example, the cycle number may exceed one or more cycle number thresholds as the battery is used over time, and the temperature may exceed one or more temperature thresholds if the battery is insufficiently cooled. If no thresholds are exceeded, the battery may continue to be monitored (operation 602).

If one or more thresholds are exceeded, a charging technique for the battery is modified to manage swelling in the battery (operation 606). The charging technique may be modified by reducing the charge voltage and/or constant charge current of the battery. For example, the charge voltage may be reduced by 0.1 volts, or the constant charge current may be reduced by 100 mAh. Reductions in charge voltage and constant charge current may also be combined to manage swelling. For example, the battery may be charged at a reduced constant charge current until a reduced charge voltage is reached, then immediately disconnected from the charger instead of receiving a decreasing charge current until the battery is fully charged.

A shutdown threshold for the battery may also be reached (operation 608). For example, the shutdown threshold may correspond to a cycle number beyond which the battery should not be used. If the shutdown threshold is reached, use of the battery is disabled (operation 610) to prevent the battery from damaging the portable electronic device and/or causing a fire or explosion. If the shutdown threshold is not reached, the battery may continue to be monitored (operations 602-604) during use with the portable electronic device, and the charging technique may be modified (operation 606) as cycle number and/or temperature thresholds are exceeded to manage swelling in the battery. The battery may thus continue to be used and monitored until the user replaces the battery and/or use of the battery is disabled (operation 610) after the shutdown threshold is reached (operation 608).

Figure 7:
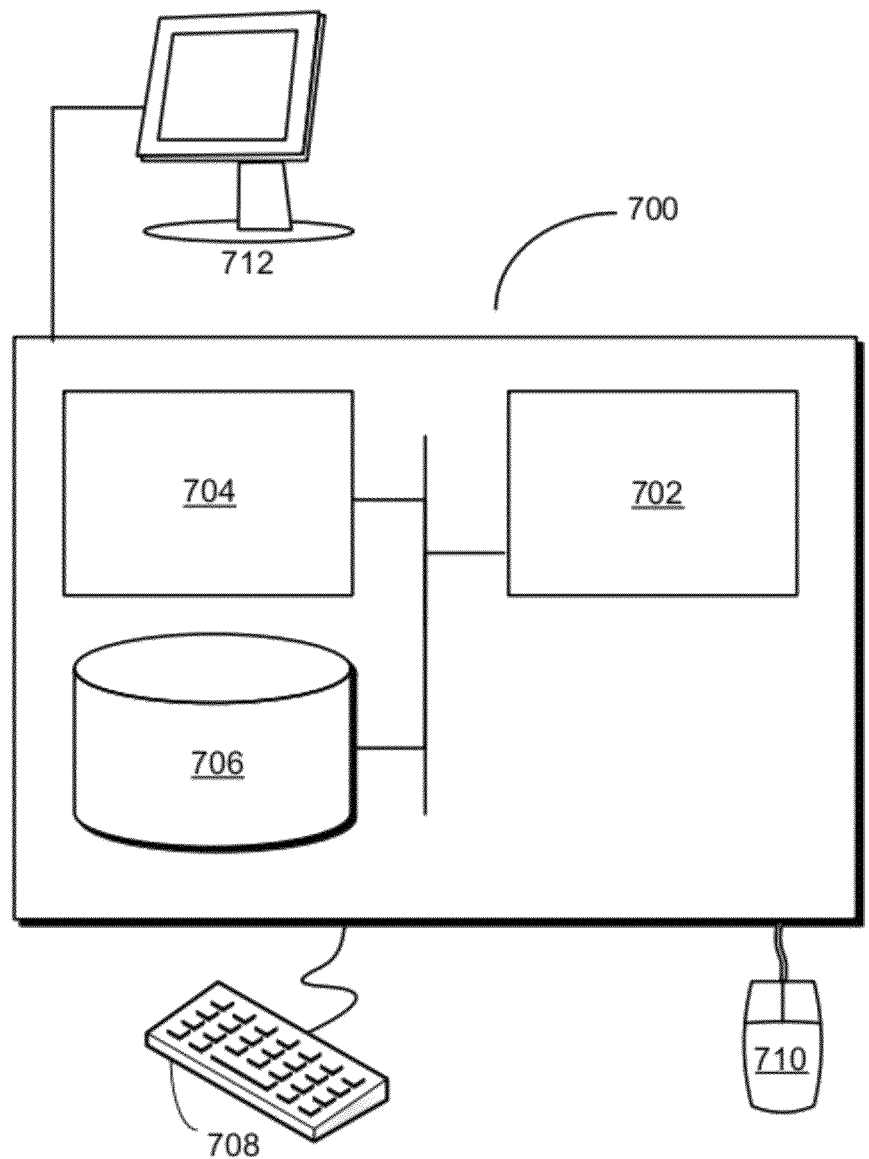
FIG. 7 shows a computer system in accordance with an embodiment.

FIG. 7 shows a computer system 700 in accordance with an embodiment. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for managing use of a battery in a portable electronic device. The system may include a monitoring apparatus that monitors a cycle number of the battery during use of the battery with the portable electronic device. The system may also include a management apparatus that modifies a charging technique for the battery to manage swelling in the battery if the cycle number exceeds one or more cycle number thresholds. The monitoring apparatus may additionally monitor a temperature of the battery during use of the battery with the portable electronic device, and the management apparatus may further modify the charging technique if the temperature exceeds one or more temperature thresholds. Finally, the management apparatus may disable use of the battery if the cycle number reaches a shutdown threshold for the battery.

In addition, one or more components of computer system 700 may be remotely located and connected to the other components over a network. Portions of the present embodiments (e.g., monitoring apparatus, management apparatus, etc.) may also be located on different nodes of a distributed system that implements the embodiments. For example, the present embodiments may be implemented using a cloud computing system that monitors and manages batteries in remote portable electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for managing use of a battery in a portable electronic device, comprising:
   monitoring a cycle number of the battery during use of the battery with the portable electronic device, wherein the cycle number corresponds to a number of charge-discharge cycles of the battery;
   monitoring a temperature of the battery during use of the battery; and
   disabling the battery if the cycle number reaches a temperature-dependent shutdown threshold, wherein the temperature-dependent shutdown threshold changes depending upon the monitored temperature of the battery.

2. The method of claim 1, further comprising:
   if the cycle number exceeds a first cycle number threshold, modifying a charging technique for the battery; and
   if the temperature exceeds a temperature threshold, further modifying the charging technique for the battery.

3. The computer-implemented method of claim 2, wherein modifying the charging technique involves:
   reducing a charge voltage of the battery if the cycle number exceeds the first cycle threshold.

4. The computer-implemented method of claim 3, wherein modifying the charging technique involves:
   further reducing the charge voltage if the cycle number exceeds a second cycle number threshold that is higher than the first cycle number threshold.

5. The computer-implemented method of claim 1, wherein modifying the charging technique involves:
   reducing a constant charge current of the battery if the cycle number exceeds the first cycle threshold.

6. The computer-implemented method of claim 5, wherein modifying the charging technique further involves:
   further reducing the constant charge current if the cycle number exceeds a second cycle number threshold that is higher than the first cycle number threshold.

7. The computer-implemented method of claim 1, wherein the battery corresponds to a lithium-polymer battery.

8. A system for managing use of a battery in a portable electronic device, comprising:
   a monitoring apparatus configured to monitor a cycle number and a temperature of the battery during use of the battery with the portable electronic device, wherein the cycle number corresponds to a number of charge-discharge cycles of the battery; and
   a management apparatus configured to disable the battery if the cycle number reaches a temperature-dependent shut down threshold, wherein the temperature-dependent shutdown threshold changes depending upon the monitored temperature of the battery.

9. The system of claim 8,
   wherein the management apparatus is configured to modify a charging technique for the battery to manage swelling in the battery if the cycle number exceeds a first cycle number threshold; and
   wherein the management apparatus is further configured to modify the charging technique if the temperature exceeds a temperature threshold.

10. The system of claim 9, wherein modifying the charging technique to manage swelling in the battery involves:
    reducing a charge voltage of the battery if the cycle number exceeds the first cycle threshold.

11. The system of claim 10, wherein modifying the charging technique to manage swelling in the battery further involves:
    further reducing the charge voltage if the cycle number exceeds a second cycle number threshold that is higher than the first cycle number threshold.

12. The system of claim 9, wherein modifying the charging technique to manage swelling in the battery involves:
    reducing a constant charge current of the battery if the cycle number exceeds the first cycle threshold.

13. The system of claim 12, wherein modifying the charging technique to manage swelling in the battery further involves:
    further reducing the constant charge current if the cycle number exceeds a second cycle number threshold that is higher than the first cycle number threshold.

14. A non-transitory computer-readable storage medium storing instructions that when executed by a computer cause the computer to perform a method for managing use of a battery in a portable electronic device, the method comprising:
    monitoring a cycle number of the battery during use of the battery with the portable electronic device, wherein the cycle number corresponds to a number of charge-discharge cycles of the battery; and
    monitoring a temperature of the battery during use of the battery; and
    disabling the battery if the cycle number reaches a temperature-dependent shutdown threshold, wherein the temperature-dependent shutdown threshold changes depending upon the monitored temperature of the battery.

15. The non-transitory computer-readable storage medium of claim 14, the method further comprising:
    if the cycle number exceeds a first cycle number threshold, modifying a charging technique for the battery; and
    if the temperature exceeds a temperature threshold, further modifying the charging technique for the battery.

16. The non-transitory computer-readable storage medium of claim 15, wherein modifying the charging technique to manage swelling in the battery involves:
    reducing a charge voltage of the battery if the cycle number exceeds the first cycle threshold.

17. The non-transitory computer-readable storage medium of claim 15, wherein modifying the charging technique to manage swelling in the battery involves:
    reducing a constant charge current of the battery if the cycle number exceeds the first cycle threshold.

18. A portable electronic device, comprising:
    a set of components powered by a battery;
    a monitoring apparatus configured to monitor a cycle number and a temperature of the battery during use of the battery with the portable electronic device, wherein the cycle number corresponds to a number of charge-discharge cycles of the battery; and a management apparatus configured to disable the battery if the cycle number reaches a temperature-dependent shut down threshold, wherein the temperature-dependent shutdown threshold changes depending upon the monitored temperature of the battery.

19. The portable electronic device of claim 18,
wherein the management apparatus is configured to modify a charging technique for the battery to manage swelling in the battery if the cycle number exceeds a first cycle number threshold; and
wherein the management apparatus is further configured to modify the charging technique if the temperature exceeds a temperature threshold.

20. The portable electronic device of claim 19, wherein modifying the charging technique to manage swelling in the battery involves at least one of:
reducing a charge voltage of the battery if the cycle number exceeds the first cycle threshold; and
reducing a constant charge current of the battery if the cycle number exceeds the first cycle threshold.

21. The portable electronic device of claim 18, wherein the battery corresponds to a lithium-polymer battery.

\* \* \* \* \*

UNITED STATES PATENT AND TRADEMARK OFFICE
CERTIFICATE OF CORRECTION

PATENT NO. : 8,513,919 B2
APPLICATION NO. : 12/845018
DATED : August 20, 2013
INVENTOR(S) : Ramesh C. Bhardwaj et al.

Page 1 of 1

It is certified that error appears in the above-identified patent and that said Letters Patent is hereby corrected as shown below:

On the title page, Item (75) please replace the second inventor's name, "Taisum Hwang" with --Taisup Hwang--.

Signed and Sealed this
Eighth Day of October, 2013

Teresa Stanek Rea
*Deputy Director of the United States Patent and Trademark Office*